(12) United States Patent
Genz et al.

(10) Patent No.: US 6,310,114 B1
(45) Date of Patent: *Oct. 30, 2001

(54) METHOD OF PREPARING COMPACT OR CELLULAR POLYURETHANE ELASTOMERS AND ISOCYANATE PREPOLYMERS SUITABLE THEREFOR

(75) Inventors: Manfred Genz, Damme; Walter Haselhorst, Osnabrück; Torsten Jeschke, Wimmer; Ute Nichau, Lünne; Heinz Bollmann, Alfhausen; Michael Strauss; Wolfgang Scholz, both of Lemförde; Rüdiger Voelkel, Bensheim; Hartmut Peuker, Bissendorf; Gerhard Hellmann, Bad Dürkheim, all of (DE)

(73) Assignee: BASF Aktiengesellschaft, Ludwigshafen (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/043,280
(22) PCT Filed: Sep. 9, 1996
(86) PCT No.: PCT/EP96/03946
  § 371 Date: Aug. 21, 1998
  § 102(e) Date: Aug. 21, 1998
(87) PCT Pub. No.: WO97/10278
  PCT Pub. Date: Mar. 20, 1997

(30) Foreign Application Priority Data

Sep. 15, 1995 (DE) .............................................. 195 34 163

(51) Int. Cl.[7] .................................................. C08G 18/14
(52) U.S. Cl. ........................ 521/159; 521/170; 521/174; 528/59; 528/65; 528/66; 568/25; 568/26; 568/330; 568/359
(58) Field of Search ..................................... 521/159, 170, 521/174; 528/59, 65, 66; 568/25, 26, 330, 359

(56) References Cited

U.S. PATENT DOCUMENTS

| | | |
|---|---|---|
| 4,191,818 | 3/1980 | Illers et al. |
| 4,334,033 | 6/1982 | Metzinger et al. |
| 4,521,582 | 6/1985 | Goyert et al. |
| 4,647,596 | 3/1987 | Ishii et al. |
| 4,798,851 | 1/1989 | Werner et al. |
| 5,173,518 | 12/1992 | Bott et al. |

FOREIGN PATENT DOCUMENTS

| | | |
|---|---|---|
| 29 40 856 A1 | 4/1981 | (DE) . |
| A-0-135 111A2 | 3/1985 | (EP) . |

OTHER PUBLICATIONS

Heilig G. Plastics 81 (1991), pp. 622–625.
Heilig G. et al, Plastics 81 (1991), pp. 790–794.

Primary Examiner—John M. Cooney, Jr.
(74) Attorney, Agent, or Firm—Fernando A. Borrego

(57) ABSTRACT

Compact and preferably cellular polyurethane elastomers are produced by reacting a) polyhydroxyl compounds having molecular weights of from 800 to 6000 and, if desired, b) chain extenders and/or crosslinkers having molecular weights of up to 800 [lacuna]

c) naphthylene 1,5-diisocyanate and at least one additional aromatic diisocyanate selected from the group consisting of tolylene diisocyanate, diphenylmethane diisocyanate, 3,3'-dimethylbiphenyl diisocyanate, 1,2-diphenylethane diisocyanate and phenylene diisocyanate, and/or aliphatic diisocyanate having from 4 to 12 carbon atoms and/or cycloaliphatic diisocyanate having from 6 to 18 carbon atoms, where the formative components (a), (c) and, if used, (b) are preferably reacted by the prepolymer method, in the presence or absence of d) catalysts, e) blowing agents and f) additives. Isocyanate prepolymers suitable for this purpose are also described.

16 Claims, 1 Drawing Sheet

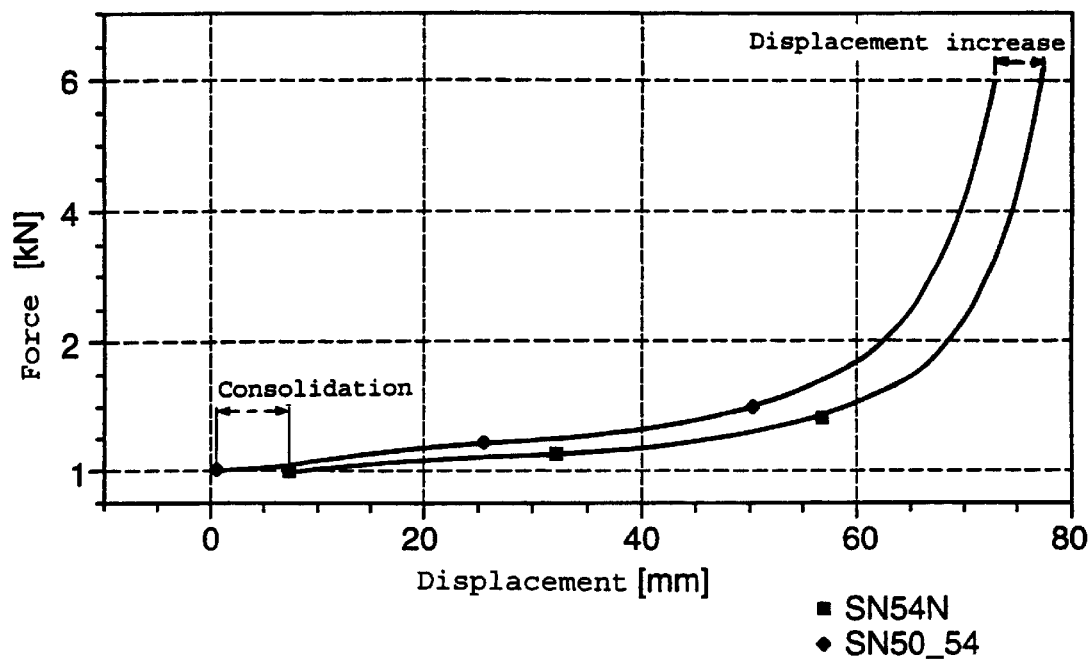

METHOD OF PREPARING COMPACT OR CELLULAR POLYURETHANE ELASTOMERS AND ISOCYANATE PREPOLYMERS SUITABLE THEREFOR

The present invention relates to a process for producing compact and preferably cellular polyurethane elastomers, hereinafter also abbreviated to PU elastomers, by reacting a) polyhydroxyl compounds having molecular weights of from 800 to 6000 and, if desired, b) chain extenders and/or crosslinkers having molecular weights of up to 800 with c) naphthylene 1,5-diisocyanate and at least one additional aromatic diisocyanate selected from the group consisting of tolylene diisocyanate, diphenylmethane diisocyanate, 3,3'-dimethylbiphenyl diisocyanate, 1,2-diphenylethane diisocyanate and phenylene diisocyanate, and/or aliphatic diisocyanate having from 4 to 12 carbon atoms an d/or cycloaliphatic diisocyanate having from 6 to 18 carbon atoms, where the formative components (a), (c) and, if used, (b) are preferably reacted by the prepolymer method, in the absence or preferably in the presence of d) catalysts, e) water-containing blowing agents and f) additives, and isocyanate prepolymers suitable for this purpose, preferably those based on diphenylmethane 4,4'-diisocyanate (MDI) and naphthylene 1,5-diisocyanate (NDI).

The microcellular PU elastomers display excellent static and dynamic properties. Owing to their specific damping characteristics and long-term use properties, they are used, in particular, in vibration- and shock-damping systems.

The production of compact or cellular, eg. microcellular, PU elastomers has been known for a long time from numerous patent and literature publications.

Their industrial importance depends on the combination of good mechanical properties with the advantages of inexpensive processing methods. The use of various chemical formative components in different mixing ratios enables the production of thermoplastically processible or crosslinked, compact or cellular PU elastomers which display a wide variety of processing properties and mechanical properties. An overview of PU elastomers, their properties and uses is given, for example, in Kunststoff-Handbuch, volume 7, Polyurethane, 1st edition, 1966, edited by Dr. R. Vieweg and Dr. A. Höchtlen, 2nd edition, 1983, edited by Dr. G. Oertel, and 3rd edition, 1993, edited by Prof. Dr. G. W. Becker and Prof. Dr. D. Braun, (Carl-Hanser-Verlag, Munich, Vienna).

In comparison with the types of rubber which can be used in a similar manner, microcellular PU elastomers have significantly better damping properties together with an excellent volume compressibility, so that they are used as constituents of vibration- and shock-damping systems, particularly in the automobile industry. For producing microcellular PU elastomers, reaction products of 1,5-NDI and poly(ethylene glycol adipate) having a molecular weight of 2000, which are reacted in the form of an isocyanate prepolymer with an activator-containing, aqueous solution of a fatty acid sulfonate, have proven useful. (Kunststoff-Handbuch, volume 7, Polyurethane, 1st edition, pp. 270ff.)

Since such base formulations give microcellular PU elastomers having very good damping characteristics and static and dynamic performance parameters, the prior art discloses only a few efforts aimed at replacing the 1,5-NDI responsible for the good elastomer properties, despite its difficult handling because of its high melting point, by more easily handled and less costly diisocyanates, since this results in significant mechanical property losses. Characteristic property differences between PU elastomers based on 1,5-NDI and those based on 4,4'-MDI are given for compact PU elastomers in general and microcellular PU elastomers in particular in Journal of Elastomers and Plastics, Vol. 21, (1989), pages 100 to 121. Significant disadvantages described for a microcellular PU elastomer based on 4,4'-MDI are a distinctly higher degree of damping with increased material heating and significantly increased consolidation under dynamic loading, which finally lead to more rapid material wear compared with PU elastomers based on 1,5-NDI.

Despite these obvious disadvantages, attempts have been made in the production of microcellular PU elastomers to replace the 1,5-NDI by the lower-melting and less costly 4,4'-MDI. However, these attempts have been restricted to the use of new starting components, in particular relatively high molecular weight polyhydroxyl compounds, by means of which certain mechanical properties of the microcellular PU elastomer are improved.

EP-A-0 496 204 (U.S. Pat. No. 5,173,518) describes a process for producing cellular PU elastomers using polyether polycarbonate diols containing polyoxytetramethylene glycol radicals having a mean molecular weight of from 150 to 500 in condensed-in form, as relatively high molecular weight polyhydroxyl compounds. This improves the mechanical properties, in particular the elongation at break, even at relatively low temperatures. However, no improvement is found in the static compressive sets in accordance with DIN 53 572 at 70° C., which are known to correlate with the dynamic consolidation values. Even when using 1,5-NDI as polyisocyanate, only average static compressive sets are obtained.

EP-B-0 243 832 (U.S. Pat. No. 4,798,851), which describes the use of pseudoprepolymers based on 4,4'-MDI, inter alia in combination with water as blowing agent, for producing elastic, compact or cellular PU or PU-polyurea moldings, teaches the use of a hydroxyl-containing polycondensate of a short-chain polyoxytetramethylene glycol and an aliphatic dicarboxylic acid as relatively high molecular weight polyhydroxyl compound with the object of the invention being to obtain a polyhydroxyl compound containing ester groups which can readily be metered by means of pumping for producing cellular or compact PU elastomers having improved mechanical and hydrolytic properties. Information about degrees of compressive set on static or dynamic loading, by means of which vibration-resistant materials are usually characterized, is not disclosed.

DE-A-36 13 961 (U.S. Pat. No. 4,647,596) describes a microcellular PU elastomer based on 4,4'-MDI which, owing to a defined composition of the relatively high molecular weight polyhydroxy compounds, consisting of a copolymer of polytetrahydrofuran and ε-caprolactone, has mechanical properties which are a favorable compromise between static strength and dynamic stressability. Despite the use of expensive feedstocks for producing the polyhydroxyl compounds, the performance gain achieved thereby appears to be relatively small when the test values "product durability, flexural strength by the De Mattia method and compressive set at 50% compression" are examined. For example, the measured values for the compressive set, which are directly related to the practically important dynamic consolidation, show only slight improvements when using the teachings of that invention.

In addition, the test criteria "product durability and flexural strength by the De Mattia method" used appear to be insufficiently suitable for a realistic evaluation of the dynamic properties, since, in the case of partial property improvements, they are not able to satisfactorily show up the actual property differences between polyurethane elastomers based on 4,4'-MDI and 1,5-NDI. Thus, the example based on 1,5-NDI displays no qualitatively higher level of properties than the examples based on 4,4'-MDI.

The stepwise production of PU elastomers is also known. According to DE-A-25 47 864 (U.S. Pat. No. 4,191,818), a heat-resistant PU elastomer can be produced by reacting an essentially linear relatively high molecular weight dihydroxy compound with a deficiency of diisocyanate to give an adduct containing terminal hydroxyl groups and subsequently reacting this adduct with a symmetric aromatic diisocyanate in excess and alkanediols or di(alkylene glycol) terephthalates as chain extenders. If cellular PU elastomers are to be produced by this method, water can also be used as chain extender, possibly in combination with alkanediols and/or di(alkylene glycol) terephthalates.

Cellular PU elastomers can also be produced by the process described in DE-A-2 940 856 (U.S. Pat. No. 4,334,033). According to this process, the relatively high molecular weight polyhydroxyl compounds and possibly chain extenders are reacted with an organic diisocyanate in a ratio of OH to NCO groups of from 1.2:1 to 2:1 to give a hydroxyl-containing prepolymer. This is divided in a weight ratio of about 80–20:20–80 into a component (I) and a component (II). The component (I) is reacted with 1,5-NDI in a ratio of OH:NCO groups of 1:2.5–12 to give an NDI-polyurethane adduct containing NCO groups and the component (II) is combined with chain extenders, water and additives to give a mixture (II). The NDI-polyurethane adduct and the mixture (II) are finally reacted to give a cellular or compact PU elastomer. This method enables the formative components to be metered precisely and to be quickly and intensively mixed. The PU elastomers are homogeneous and have uniform mechanical properties over the entire molding.

It is an object of the present invention to provide a process for producing compact or preferably microcellular PU elastomers in which the expensive 1,5-NDI can be at least partly replaced by more easily handled and less costly organic diisocyanates. Despite the concomitant use of other organic diisocyanates, the mechanical properties of the PU elastomers produced should be improved or at least correspond essentially to those of elastomers based on 1,5-NDI. Regardless of the type of relatively high molecular weight polyhydroxyl compounds employed, the microcellular PU elastomers should possess clearly improved static and mechanical properties, in particular compressive sets and dynamic consolidation values, compared with PU elastomers based on 4,4'-MDI, so that they can be used, in particular, for producing vibration- and shock-damping systems.

We have found that this object is achieved by a process for producing compact or cellular, preferably microcellular, PU elastomers by reacting a) polyhydroxyl compounds having molecular weights of from 800 to 6000 and, if desired, b) low molecular weight chain extenders and/or crosslinkers having molecular weights of up to 800 with c) organic polyisocyanates in the presence or absence of d) catalysts, e) water-containing blowing agents and f) additives, wherein the organic polyisocyanates c) used are naphthylene 1,5-diisocyanate and at least one additional aromatic diisocyanate selected from the group consisting of tolylene diisocyanate, diphenylmethane diisocyanate, 3,3'-dimethylbiphenyl diisocyanate, 1,2-diphenylethane diisocyanate and phenylene diisocyanate, and/or aliphatic diisocyanate having from 4 to 12 carbon atoms and/or cycloaliphatic diisocyanate having from 6 to 18 carbon atoms.

To produce the PU elastomers, advantageously a polyaddition product containing urethane and isocyanate groups is prepared from the polyhydroxyl compound (b) and at least one aromatic diisocyanate selected from the group consisting of tolylene diisocyanate (TDI), MDI, 3,3'-dimethylbiphenyl diisocyanate (TODI), 1,2-diphenylethane diisocyanate (DIBDI), phenylene diisocyanate (PDI) and preferably 4,4'-MDI and/or hexamethylene 1,6-diisocyanate (HDI) and/or 1-isocyanato-3,3,5-trimethyl-5-isocyanatomethylcyclohexane (IPDI), and this polyaddition product is reacted with 1,5-NDI, which can be reacted with the polyaddition product in one step or in portions, to form the prepolymer containing isocyanate groups. Microcellular PU elastomers can be produced from such prepolymers containing isocyanate groups by reaction with water or mixtures of water and, if desired, low molecular weight chain extenders and/or crosslinkers (b) and/or relatively high molecular weight polyhydroxyl compounds (a).

The invention also provides prepolymers containing isocyanate groups and having an NCO content of from 3.3 to 10% by weight, preferably from 3.5 to 9.0% by weight, which are prepared by reacting at least one relatively high molecular weight polyhydroxyl compound (a) or a mixture of (a) and at least one low molecular weight chain extender and/or crosslinker (b) with at least one aromatic diisocyanate selected from the group consisting of TDI, MDI, TODI, DIBDI and PDI, preferably 4,4'-MDI, and/or HDI and/or IPDI to give a polyaddition product containing urethane and isocyanate groups and having an NCO content of advantageously from 0.05 to 8% by weight, preferably from 1.2 to 7.5% by weight, and reacting this polyaddition product with 1,5-NDI, which can be incorporated into the reaction mixture and reacted with the polyaddition product in one step or preferably in portions.

Since the crystallizability of the urea and/or urethane resin segments of the PU elastomers based on 1,5-NDI is considerably disrupted by the concomitant use of diisocyanates which crystallize less well, for example the low-cost 4,4'-MDI with its angled structure, those skilled in the art would have had to assume that the resulting PU elastomers have poorer static and dynamic properties than those based on an aromatic diisocyanate.

It was therefore not foreseeable that the microcellular PU elastomers produced from 1,5-NDI-containing aromatic, aliphatic and/or cycloaliphatic diisocyanate mixtures have good mechanical properties which are almost comparable with those of elastomers produced exclusively from 1,5-NDI and have static, mechanical properties, in particular compressive sets and dynamic consolidation values, which are clearly better than those of microcellular PU elastomers based on 4,4'-MDI. The microcellular PU elastomers produced by the process of the present invention are thus less costly than PU elastomers based on 1,5-NDI and, owing to their good static mechanical properties, are very useful for producing vibration- and shock-damping systems. In addition, the reaction mixture is simpler to handle and process.

The following may be said about the starting materials (a) to (f) for producing the compact or preferably cellular, eg. microcellular, PU elastomers and the process of the present invention:

a) Suitable polyhydroxyl compounds advantageously have a functionality of 3 or preferably 2 and a molecular weight of from 800 to 6000, preferably from 800 to 3500 and in particular from 1000 to 3300, and advantageously comprise hydroxyl-containing polymers, for example polyacetals such as polyoxymethylenes and especially water-insoluble formals, eg. polybutanediol formal and polyhexanediol formal, polyoxyalkylene polyols such as polyoxybutylene glycols, polyoxybutylene-polyoxyethylene glycols, polyoxybutylene-polyoxypropylene glycols, polyoxybutylene-polyoxypropylene-polyoxyethylene glycols, polyoxypropylene polyols and polyoxypropylene-polyoxyethylene polyols, and polyester polyols, eg. polyester polyols derived from organic dicarboxylic acids and/or dicarboxylic acid derivatives and dihydric to trihydric alcohols and/or dialkylene glycols, from hydroxycarboxylic acids and lactones and also hydroxyl-containing polycarbonates. Relatively high molecular weight polyhydroxyl compounds which have been found to be very useful and are therefore preferably used are difunctional polyhydroxyl compounds having molecular weights of from >800 to 3500, preferably from 1000 to 3300, and selected from the group consisting of polyester polyols, hydroxyl-containing polycarbonates and polyoxybutylene glycols. The relatively high molecular weight polyhydroxyl compounds can be used individually or as mixtures.

Suitable polyoxyalkylene polyols can be prepared by known methods, for example from one or more alkylene oxides having from 2 to 4 carbon atoms in the alkylene radical by anionic polymerization using alkali metal hydroxides such as sodium or potassium hydroxide, or alkali metal alkoxides such as sodium methoxide, sodium or potassium ethoxide or potassium isopropoxide as catalysts with addition of at least one initiator molecule containing 2 or 3, preferably 2, reactive hydrogen atoms in bonded form, or by cationic polymerization using Lewis acids such as antimony pentachloride, boron fluoride etherate, etc., or bleaching earth as catalysts.

Suitable alkylene oxides are, for example, 1,3-propylene oxide, 1,2- or 2,3-butylene oxide, preferably ethylene oxide and 1,2-propylene oxide and in particular tetrahydrofuran. The alkylene oxides can be used individually, alternately in succession or as a mixture. Suitable initiator molecules are, for example: water, organic dicarboxylic acids such as succinic acid, adipic acid, phthalic acid and terephthalic acid, aliphatic and aromatic, N-monoalkylated and N,N'-dialkylated diamines having from 1 to 4 carbon atoms in the alkyl radical, for example monoalkylated and dialkylated ethyleneamine [sic], 1,3-propylenediamine, 1,3- or 1,4-butylenediamine, 1,2-, 1,3-, 1,4-, 1,5- and 1,6-hexamethylenediamine, alkanolamines such as ethanolamine, N-methylethanolamine and N-ethylethanolamine, dialkanolamines such as diethanolamine, N-methyldiethanolamine and N-ethyldiethanolamine, and trialkanolamines such as triethanolamine, and ammonia. Preference is given to using dihydric and/or trihydric alcohols, eg. alkanediols having from 2 to 12 carbon atoms, preferably from 2 to 4 carbon atoms, for example ethanediol, 1,2- and 1,3-propanediol, 1,4-butanediol, 1,5-pentanediol, 1,6-hexanediol, glycerol and trimethylolpropane, and dialkylene glycols such as diethylene glycol and dipropylene glycol.

As polyoxyalkylene polyols, preference is given to using polyoxybutylene glycols (polyoxytetramethylene glycols) having molecular weights of from 500 to 3000, preferably from 650 to 2300.

Other preferred polyhydroxyl compounds (a) are polyester polyols which can be prepared, for example, from alkanedicarboxylic acids having from 2 to 12 carbon atoms, preferably alkanedicarboxylic acids having from 4 to 6 carbon atoms, and/or aromatic dicarboxylic acids and polyhydric alcohols, preferably alkanediols having from 2 to 12 carbon atoms, preferably from 2 to 6 carbon atoms, and/or dialkylene glycols. Examples of suitable alkanedicarboxylic acids are: succinic acid, glutaric acid, adipic acid, suberic acid, azelaic acid, sebacic acid and decanedicarboxylic acid. Suitable aromatic dicarboxylic acids are, for example, phthalic acid, isophthalic acid and terephthalic acid. The alkanedicarboxylic acids can be used either individually or in admixture with one another. In place of the free dicarboxylic acids, it is also possible to use the corresponding dicarboxylic acid derivatives such as dicarboxylic monoesters or diesters of alcohols having from 1 to 4 carbon atoms or dicarboxylic anhydrides. Preference is given to using dicarboxylic acid mixtures of succinic, gluratic and adipic acid in weight ratios of, for example, 20–35:35–50:20–32, and in particular adipic acid. Examples of dihydric and polyhydric alcohols, in particular alkanediols or dialkylene glycols are: ethanediol, diethylene glycol, 1,2- or 1,3-propanediol, dipropylene glycol, 1,4-butanediol, 1,5-pentanediol, 1,6-hexanediol, 1,10-decanediol, glycerol and trimethylolpropane. Preference is given to using ethanediol, diethylene glycol, 1,4-butanediol, 1,5-pentanediol, 1,6-hexanediol or mixtures of at least two of the diols mentioned, in particular mixtures of 1,4-butanediol, 1,5-pentanediol and 1,6-hexanediol. It is also possible to use polyester polyols from lactones, eg. ε-caprolactone or hydroxycarboxylic acids, eg. ω-hydroxycaproic acid.

To prepare the polyester polyols, the aromatic and/or aliphatic dicarboxylic acids and preferably alkanedicarboxylic acids and/or derivatives and polyhydric alcohols can be polycondensed in the absence of catalysts or preferably in the presence of esterification catalysts, advantageously in an atmosphere of inert gases such as nitrogen, helium, argon, etc., in the melt at from 150 to 250° C., preferably from 180 to 220° C., at atmospheric pressure or under reduced pressure to the desired acid number which is advantageously less than 10, preferably less than 2. According to a preferred embodiment, the esterification mixture is polycondensed at the abovementioned temperatures to an acid number of from 80 to 30, preferably from 40 to 30, under atmospheric pressure and subsequently under a pressure of less than 500 mbar, preferably from 50 to 150 mbar. Examples of suitable esterification catalysts are iron, cadmium, cobalt, lead, zinc, antimony, magnesium, titanium and tin catalysts in the form of metals, metal oxides or metal salts. However, the polycondensation can also be carried out in the liquid phase in the presence of diluents and/or entrainers such as benzene, toluene, xylene or chlorobenzene to azeotropically distill off the water of condensation.

To prepare the polyester polyols, the organic polycarboxylic acids and/or derivatives and polyhydric alcohols are advantageously polycondensed in a molar ratio of 1:1–1.8, preferably 1:1.05–1.2.

As polyester polyols, preference is given to using poly(alkanediol adipates) such as poly(ethanediol adipates), poly(1,4-butanediol adipates), poly (ethanediol-1,4-butanediol adipates), poly(1,6-hexanediol-neopentyl glycol adipates) and poly(1,6-hexanediol-1,4-butanediol adipates) and polycaprolactones.

Other suitable polyester polyols are hydroxyl-containing polycarbonates. Such hydroxyl-containing polycarbonates can be prepared, for example, by reacting the abovementioned alkanediols, in particular 1,4-butanediol and/or 1,6-hexanediol, and/or dialkylene glycols such as diethylene glycol, dipropylene glycol and dibutylene glycol with dialkyl or diaryl carbonates, eg. diphenyl carbonate, or phosgene.

As hydroxyl-containing polycarbonates, preference is given to using polyether polycarbonate diols which can be prepared by polycondensation of a1) polyoxybutylene glycol having a molecular weight of from 150 to 500 or of a2) mixtures comprising
  i) at least 10 mol%, preferably from 50 to 95 mol%, of a polyoxybutylene glycol having a molecular weight of from 150 to 500 (a1) and
  ii) less than 90 mol%, preferably from 5 to 50 mol%, of at least one polyoxyalkylene glycol different from (a1) and having a molecular weight of from 150 to 2000, at least one dialkylene glycol, at least one linear or branched alkanediol having from 2 to 12 carbon atoms and at least one cyclic alkanediol having from 5 to 15 carbon atoms or mixtures thereof
    with phosgene, diphenyl carbonate or dialkyl carbonates having $C_1$–$C_4$-alkyl groups.

b) For producing the compact or preferably cellular PU elastomers by the process of the present invention, difunctional chain extenders (b), preferably trifunctional or tetrafunctional crosslinkers (b) or mixtures of chain extenders and crosslinkers having molecular weights of up to 800 can, if desired, be used in addition to the polyhydroxyl compounds (a).

Such chain extenders and crosslinkers (b) are used for modifying the mechanical properties, in particular the hardness, of the PU elastomers. Suitable chain extenders such as alkanediols, dialkylene glycols and polyoxyalkylene glycols, and crosslinkers, eg. trihydric or tetrahydric alcohols and oligomeric polyoxyalkylene polyols having a functionality of from 3 to 4, usually have molecular weights of less than 800, preferably from 18 to 400 and in particular from 60 to 300. As chain extenders, preference is given to using alkanediols having from 2 to 12 carbon atoms, preferably 2, 4 or 6 carbon atoms, for example ethanediol, 1,3-propanediol, 1,5-pentanediol, 1,6-hexanediol, 1,7-heptanediol, 1,8-octanediol, 1,9-nonanediol, 1,10-decanediol and in particular 1,4-butanediol, and dialkylene glycols having from 4 to 8 carbon atoms, for example diethylene glycol and dipropylene glycol, and also polyoxyalkylene glycols. However, other suitable compounds are branched-chain and/or unsaturated alkanediols having usually not more than 12 carbon atoms, for example 1,2-propanediol, 2-methylpropane-1,3-diol, 2,2-dimethylpropane-1,3-diol, 2-butyl-2-ethylpropane-1,3-diol, but-2-ene-1,4-diol and but-2-yne-1,4-diol, diesters of terephthalic acid with glycols having from 2 to 4 carbon atoms, for example bis (ethylene glycol) terephthalate or bis(1,4-butanediol) terephthalate, hydroxyalkylene ethers of hydroquinone or resorcinol, for example 1,4-di(β-hydroxyethyl) hydroquinone or 1,3-di(β-hydroxyethyl)resorcinol, alkanolamines having from 2 to 12 carbon atoms, for example ethanolamine, 2-aminopropanol and 3-amino-2,2-dimethylpropanol, N-alkyldialkanolamines such as N-methyldiethanolamine and N-ethyldiethanolamine, (cyclo)aliphatic diamines having from 2 to 15 carbon atoms, for example ethylenediamine, 1,2- or 1,3-propylenediamine, 1,4-butylenediamine and 1,6-hexamethylenediamine, isophoronediamine, 1,4-cyclohexylenediamine and 4,4'-diaminodicyclohexylmethane, N-alkylalkylenediamines and N,N'-dialkylalkylenediamines such as N-methylpropylenediamine and N,N'-dimethylethylenediamine and aromatic diamines such as methylenebis(methyl 4-amino-3-benzoate), 1,2-bis (2-aminophenylthio)ethane, trimethylene glycol-di-p-aminobenzoate, 2,4- and 2,6-tolylenediamine, 3,5-diethyl-2,4- and -2,6-tolylenediamine, 4,4'-diaminodiphenylmethane, 3,3'-dichloro-4,4'-diaminodiphenylmethane and primary ortho-dialkyl-, -trialkyl- and/or -tetraalkyl-substituted 4,4'-diaminodiphenylmethanes such as 3,3'-diisopropyl- and 3,3',5,5'-tetraisopropyl-4,4'-diaminodiphenylmethane.

Examples of at least trifunctional crosslinkers which can advantageously be used for producing the PU casting elastomers are: trifunctional and tetrafunctional alcohols such as glycerol, trimethylolpropane, pentaerythritol and trihydroxycyclohexanes, and tetrahydroxyalkylalkylenediamines such as tetra(2-hydroxyethyl)ethylenediamine or tetra(2-hydroxypropyl)ethylenediamine, and also oligomeric polyoxyalkylene polyols having a functionality of from 3 to 4.

The chain extenders and crosslinkers (b) which are suitable according to the present invention can be used individually or in the form of mixtures. It is also possible to use mixtures of chain extenders and crosslinkers.

To adjust the hardness of the PU elastomers, the mixing ratios of the formative components (a) and (b) can be varied within a relatively broad range, with the hardness increasing with increasing content of difunctional chain extenders and at least trifunctional crosslinkers in the PU elastomer.

Depending on the desired hardness, the required amounts of the formative components (a) and (b) can be experimentally determined in a simple manner. From 5 to 50% by weight of the chain extender and/or crosslinker (b), based on the weight of the relatively high molecular weight polyhydroxyl compound (a), are advantageously used, with preference being given to using from 30 to 50% by weight for producing rigid PU elastomers.

c) According to the present invention, the compact and preferably microcellular PU elastomers are produced using two organic polyisocyanates of which one is 1,5-NDI. As aromatic diisocyanates different from 1,5-NDI, use is made of tolylene diisocyanates, eg. 2,4- and 2,6-TDI and commercial mixtures, diphenylmethane diisocyanates, eg. 2,4'-, 2,2'- and preferably 4,4'-MDI and mixtures of at least two of the specified MDI isomers, 3,3'-dimethylbiphenyl diisocyanates, eg. 3,3'- dimethyl-4,4'-diisocyanatobiphenyl (TODI), 1,2-diphenylethane diisocyanates, eg. 2,4'-, 2,2'- and preferably 4,4'-DIBDI and mixtures of at least two of the specified DIBDI isomers, and phenylene diisocyanates, preferably 1,4-PDI (p-phenylene diisocyanate; PPDI). Owing to its good processibility and the very good mechanical properties of the elastomers which can be achieved therewith, 4,4'-MDI is particularly preferably used in combination with 1,5-NDI for producing the compact and preferably microcellular PU elastomers. The molar ratio of 1,5-NDI to the aromatic diisocyanates selected from the group consisting of TDI, MDI, TODI, DIBDI and PDI can be varied over a wide range, eg. 1,5-NDI to aromatic diisocyanates of from 1:0.1 to 1:10, preferably from 1:0.11 to 1:9 and in particular from 1:1 to 1:4, without the static and dynamic properties being significantly changed. When using 1,5-NDI and 4,4'-MDI, the preferred combination, the 1,5-NDI/4,4'-MDI molar ratio is advantageously in the range from 1:0.1 to 1:10, preferably from 1:0.11 to 1:9 and in particular from 1:1 to 1:4. The aromatic diisocyanates can, if necessary, be melted individually and mixed or mixed and melted together and used as a melt for producing the PU elastomers, or the solid diisocyanate can be introduced into the melt of the other diisocyanate and melted and dissolved therein. According to the last-named process variant, solid 1,5-NDI (melting point 128.5° C.) is usually introduced into a 4,4'-MDI melt and dissolved with melting.

In place of the aromatic diisocyanates or in admixture therewith, it is also possible to use aliphatic diisocyanates having from 4 to 12 carbon atoms, preferably from 4 to 6 carbon atoms, in the branched-chain or preferably linear alkylene radical and/or cycloaliphatic diisocyanates having from 6 to 18 carbon atoms, preferably from 6 to 10 carbon atoms, in the unsubststituted or alkyl-substituted cycloalkylene radical for producing the compact and preferably cellular PU elastomers. Examples which may be mentioned of aliphatic diisocyanates are dodecane 1,12-diisocyanate, 2-ethylbutane 1,4-diisocyanate, 2-methylpentane 1,5-diisocyanate, butane 1,4-diisocyanate and preferably hexamethylene 1,6-diisocyanate (HDI). Examples of suitable cycloaliphatic diisocyanates are: cyclohexane 1,3- and 1,4-diisocyanate, hexahydrotolylene 2,4- and 2,6-diisocyanate, dicyclohexylmethane 4,4'-, 2,4'- and 2,2'-diisocyanate and preferably 1-isocyanato-3,3,5-trimethyl-5-isocyanatomethylcyclohexane (isophorone diisocyanate, IPDI).

The organic polyisocyanates (c) are used in the form of a prepolymer containing isocyanate groups. These can be prepared, for example, by reacting the 1,5-NDI-containing diisocyanate melt with at least one relatively high molecular weight polyhydroxyl compound (a) or a mixture of (a) and at least one low molecular weight chain extender and/or at least one crosslinker (b) or by stepwise reaction of the 1,5-NDI-containing diisocyanate melt with at least one relatively high molecular weight polyhydroxyl compound (a) and subsequently with at least one chain extender and/or crosslinker. However, preference is given to using prepolymers containing isocyanate groups and prepared by reacting a partial amount or the total amount of at least one relatively high molecular weight polyhydroxyl compound (a) or a partial amount or the total amount of the mixture of (a) and at least one low molecular weight chain extender and/or crosslinker (b) with at least one aromatic diisocyanate selected from the group consisting of TDI, MDI, TODI, DIBDI and PDI, preferably with 4,4'-MDI and/or HDI and/or IPDI, to give a polyaddition product containing urethane groups, preferably urethane and isocyanate groups, and having an NCO content of from 0.05 to 8.0% by weight, preferably from 1.2 to 7.5% by weight, and reacting this polyaddition product with 1,5-NDI to give the prepolymer containing isocyanate groups.

To prepare the polyaddition products containing urethane and isocyanate groups, the formative components (a), if desired (b) and (c) are advantageously used in such amounts that the equivalence ratio of the hydroxyl groups of (a) or (a) and (b) to isocyanate groups of the aromatic diisocyanates TDI, MDI, TODI, DIBDI and PDI, preferably 4,4'-MDI, and/or HDI and/or IPDI, is 1:(>1 to 6), preferably 1:1.01-4. The polyaddition products containing urethane and isocyanate groups are then converted into the prepolymer containing isocyanate groups by reaction with such an amount of 1,5-NDI, which can be reacted in one step or preferably in portions in a plurality of steps, preferably in 2 steps, that the equivalence ratio of the hydroxyl groups of (a) or (a) and (b) to isocyanate groups of 1,5-NDI is 1:0.02–6, preferably 1:0.1–5 and in particular 1:0.2–3.

As already mentioned, mixtures of (a) and (b) can be used for preparing the prepolymers containing isocyanate groups. However, according to a preferred embodiment, the prepolymers containing isocyanate groups are prepared by reacting exclusively relatively high molecular weight polyhydroxyl compounds (a) with the polyisocyanates (c), preferably with 4,4'-MDI and 1,5-NDI. Particularly suitable polyhydroxyl compounds for this purpose are difunctional polyhydroxyl compounds having a molecular weight of from 500 to 6000, preferably from >800 to 3500 and in particular from 1000 to 3300, and selected from the group consisting of polyester polyols, hydroxyl-containing polycarbonates and polyoxytetramethylene glycols.

When using 4,4'-MDI and 1,5-NDI as aromatic diisocyanates, it has been found to be useful to employ equivalence ratios of the hydroxyl groups of (a) and (b), preferably exclusively (a), to NCO groups of the 4,4'-MDI to NCO groups of the 1,5-NDI of 1: (>1 to 6) :0.02–6.

The prepolymers containing isocyanate groups which can be used according to the present invention and are preferably prepared by the abovementioned process variants advantageously have isocyanate contents of from 3.3 to 10% by weight, preferably from 3.5 to 9% by weight, based on their total weight.

To prepare the prepolymers containing isocyanate groups, the polyhydroxyl compounds (a) or mixtures of (a) and chain extenders and/or crosslinkers (b) can be reacted with the organic polyisocyanates (c), eg. in the form of a 1,5-NDI-containing aromatic diisocyanate mixture or preferably stepwise, where at least one aromatic diisocyanate selected from the group consisting of TDI, MDI, TODI, DIBDI and PDI, preferably 4,4'-MDI, is used first and 1,5-NDI is added subsequently, at from 80 to 160° C., preferably from 110 to 150° C.

Thus, for example, the total amount or, if desired, partial amounts of 1,5-NDI can be dissolved in an aromatic diisocyanate, preferably 4,4'-MDI, heated to, for example, 110° C. and the polyhydroxyl compound (a) and, if desired, chain extender and/or crosslinker (b) heated to, for example, 125° C. can be added to the diisocyanate mixture. After the mixture has gone through the maximum reaction temperature, which is usually in the range from 130 to 150° C., any remaining partial amounts of 1,5-NDI can be added and reacted during the cooling phase, eg. at from 120 to 130° C.

According to another process variant which is preferably employed, the component (a) or a mixture of (a) and (b) can be heated to, for example, 140° C. and at this temperature, for example, the aromatic diisocyanate, preferably the total amount of the 4,4'-MDI heated to 50° C., can be added. Immediately after the 4,4'-MDI addition, all the 1,5-NDI can be incorporated or partial amounts of 1,5-NDI can be added over a period of time. It has been found to be advantageous to incorporate a partial amount of 1,5-NDI immediately after the 4,4'-MDI addition and to incorporate the other partial amount(s) into the reaction mixture during the cooling phase.

After reaching the theoretically calculated isocyanate content, the reaction is ended. This usually requires reaction times in the range from 15 to 200 minutes, preferably from 40 to 150 minutes.

The prepolymers containing isocyanate groups can be prepared in the presence of catalysts. However, it is also possible to prepare the prepolymers containing isocyanate groups in the absence of catalysts and to incorporate these into the reaction mixture for producing the PU elastomers.

d) As catalysts (d), use is advantageously made of compounds which strongly accelerate the reaction of the hydroxyl-containing compounds of the components (a) and, if used, (b) with the polyisocyanates (c). Suitable catalysts are organic metal compounds, preferably organic tin compounds such as tin(II) salts of organic carboxylic acids, eg. tin(II) acetate, tin(II) octoate, tin(II) ethylhexanoate and tin(II) laurate, and the dialkyltin(IV) salts of organic carboxylic acids, eg. dibutyltin diacetate, dibutyltin dilaurate, dibutyltin maleate and dioctyltin diacetate. The organic metal compounds are used alone or preferably in combination with strongly basic amines. Examples which may be mentioned are amidines such as 2,3-dimethyl-3,4,5,6-tetrahydropyrimidine, tertiary amines such as triethylamine, tributylamine, dimethylbenzylamine, N-methylmorpholine, N-ethylmorpholine, N-cyclohexylmorpholine, N,N,N',N'-tetraalkylalkylenediamines such as N,N,N',N'-tetramethylethylenediamine, N,N,N',N'-tetramethylbutanediamine or N,N,N',N'-tetramethylhexanediamine, pentamethyldiethylenetriamine, bis(dimethylaminoethyl) ether, bis(dimethylaminopropyl) urea, 1,4-dimethylpiperazine, 1,2-dimethylimidazole, 1-azabicyclo[3.3.0]octane and preferably 1,4-diazabicyclo[2.2.2]octane and alkanolamine compounds such as triethanolamine, triisopropanolamine, N-methyldiethanolamine and N-ethyldiethanolamine and dimethylethanolamine. Preference is given to using from 0.001 to 3% by weight, in particular from 0.01 to 1% by weight, of catalyst or catalyst combination, based on the weight of the formative components (a), (c) and, if used, (b).

e) Compact PU elastomers such as PU casting elastomers can be produced by the process of the present invention in the absence of moisture and of physically or chemically acting blowing agents. However, the process is preferably employed for producing cellular, preferably microcellular, PU elastomers. The blowing agent (e) used for this purpose is water which reacts in situ with the organic polyisocyanates and preferably prepolymers containing isocyanate groups (a) to form carbon dioxide and amino groups which in turn react further with the isocyanate prepolymers to give urea groups and thus act as chain extenders.

Since the formative components (a) and, if used, (b) can contain water because of their preparation and/or chemical composition, in many cases no separate addition of water to the formative components (a) and, if used, (b) or to the reaction mixture is necessary. However, if additional water has to be incorporated into the polyurethane formulation to achieve the desired bulk density, this is usually employed in amounts of from 0.001 to 3.0% by weight, preferably from 0.01 to 2.0% by weight and in particular from 0.2 to 1.2% by weight, based on the weight of the formative components (a) to (c).

As blowing agents (e), it is also possible to use, in combination with water, low-boiling liquids which vaporize under the action of the exothermic polyaddition reaction and advantageously have a boiling point at atmospheric pressure in the range from −40 to 120° C., preferably from 10 to 90° C., or gases as physically acting blowing agents or chemically acting blowing agents.

The liquids of the abovementioned type and gases suitable as blowing agents can, for example, be selected from the group consisting of alkanes such as propane, n- and iso-butane, n- and iso-pentane and preferably industrial pentane mixtures, cycloalkanes and cycloalkenes such as cyclobutane, cyclopentene, cyclohexene and preferably cyclopentane and/or cyclohexane, dialkyl ethers such as dimethyl ether, methyl ethyl ether or diethyl ether, tert-butyl methyl ether, cycloalkylene ethers such as furan, ketones such as acetone, methyl ethyl ketone, acetals and/or ketals such as formaldehyde dimethylacetal, 1,3-dioxolane and acetone dimethylacetal, carboxylic esters such as ethyl acetate, methyl formate and tert-butyl ethylene-acrylate, tertiary alcohols such as tertiary butanol, fluoroalkanes which are degraded in the troposphere and therefore do not damage the ozone layer, for example trifluoromethane, difluoromethane, difluoroethane, tetrafluoroethane and heptafluoroethane, chloroalkanes such as 2-chloropropane, and gases such as nitrogen, carbon monoxide and noble gases such as helium, neon and krypton and blowing agents having a chemical action analogous to that of water, for example carboxylic acids such as formic acid, acetic acid and propionic acid.

Among the liquids which are inert toward NCO groups and are suitable as blowing agent (e), preference is given to using alkanes having from 4 to 8 carbon atoms, cycloalkanes having from 4 to 6 carbon atoms or mixtures having a boiling point of from −40 to 50° C. at atmospheric pressure and consisting of alkanes and cycloalkanes. Particular preference is given to using $C_5$-(cyclo)alkanes such as n-pentane, iso-pentanes and cyclopentane and their industrial mixtures.

Other suitable blowing agents are salts which decompose thermally, for example ammonium bicarbonate, ammonium carbamate and/or ammonium salts of organic carboxylic acids, eg. the monoammonium salts of malonic acid, boric acid, formic acid or acetic acid.

The most advantageous amount of solid blowing agents, low-boiling liquids and gases, which can each be used individually or in the form of mixtures, eg. as liquid mixtures or gas mixtures or as gas/liquid mixtures, depends on the density which is to be achieved and the amount of water used. The amounts required can easily be determined by simple tests. Satisfactory results are usually given by amounts of solids of from 0.5 to 35 parts by weight, preferably from 2 to 15 parts by weight, amounts of liquids of from 1 to 30 parts by weight, preferably from 3 to 18 parts by weight, and/or amounts of gases of from 0.01 to 80 parts by weight, preferably from 10 to 35 parts by weight, in each case based on the weight of the formative components (a), (c) and, if used, (b). Gas loading with, for example, air, carbon dioxide, nitrogen and/or helium can be carried out either via the relatively high molecular weight [lacuna] chain extenders and/or crosslinkers (b) or via the polyisocyanates (c) or via (a) and (c) and, if used, (b).

Blowing agents which are not used are, as already indicated, perhalogenated chlorofluorocarbons.

f) If desired, additives (f) can also be incorporated into the reaction mixture for producing the compact and preferably cellular PU elastomers. Examples which may be mentioned are surface-active substances, foam stabilizers, cell regulators, fillers, flame retardants, nucleating agents, oxidation inhibitors, stabilizers, lubricants and mold release agents, dyes and pigments.

Suitable surface-active substances are, for example, compounds which serve to aid the homogenization of the starting materials and may also be suitable for regulating the cell structure. Examples which may be mentioned are emulsifiers such as the sodium salts of castor oil sulfates or fatty acids and also amine salts of fatty acids, eg. diethylamine oleate, diethanolamine stearate, diethanolamine ricinoleate, salts of sulfonic acids, eg. alkali metal or ammonium salts of dodecylbenzene- or dinaphthylmethanedisulfonic acid and ricinoleic acid; foam stabilizers such as siloxane-oxyalkylene copolymers and other organopolysiloxanes, ethoxylated alkylphenols, ethoxylated fatty alcohols, paraffin oils, castor oil or ricinoleic esters, Turkey red oil and peanut oil and cell regulators such as paraffins, fatty alcohols and dimethylpolysiloxanes. Oligomeric polyacrylates having polyoxyalkylene and fluoroalkane radicals as side groups are also suitable for improving the emulsifying action, the cell structure and/or the stabilization thereof. The surface-active substances are usually employed in amounts of from 0.01 to 5 parts by weight, based on 100 parts by weight of the relatively high molecular weight polyhydroxyl compounds (a).

For the purposes of the present invention, fillers, in particular reinforcing fillers, are the customary organic and inorganic fillers, reinforcements and weighting agents known per se. Specific examples are: inorganic fillers such as siliceous minerals, for example sheet silicates such as antigorite, serpentine, hornblendes, amphiboles, chrysotile, talc; metal oxides such as kaolin, aluminum oxides, aluminum silicate, titanium oxides and iron oxides, metal salts such as chalk, barite and inorganic pigments such as cadmium sulfide, zinc sulfide and also glass particles. Suitable organic fillers are, for example: carbon black, melamine, expanded graphite, rosin, cyclopentadienyl resins and graft polymers.

As reinforcing fillers, preference is given to using fibers, for example carbon fibers or in particular glass fibers, particularly when a high heat distortion resistance or very high stiffness is required, with the fibers being able to be provided with coupling agents and/or sizes. Suitable glass fibers [lacuna], for example, are also used in the form of woven glass fabrics, glass mats, glass nonwovens and/or preferably fiberglass rovings or chopped fiberglass of low-alkali E glasses having a diameter of from 5 to 200 $\mu$m, preferably from 6 to 15 $\mu$m, generally have a mean fiber length of from 0.05 to 1 mm, preferably from 0.1 to 0.5 mm, after incorporation into the molding compositions.

The inorganic and organic fillers can be used individually or as mixtures and are usually incorporated into the reaction mixture in amounts of from 0.5 to 50% by weight, preferably from 1 to 30% by weight, based on the weight of the formative components (a) to (c).

Suitable flame retardants are, for example, tricresyl phosphate, tris(2-chloroethyl) phosphate, tris(2-chloropropyl) phosphate, tris(1,3-dichloropropyl) phosphate, tris(2,3-dibromopropyl) phosphate and tetrakis(2-chloroethyl)ethylene diphosphate.

Apart from the halogen-substituted phosphates mentioned above, it is also possible to use inorganic flame retardants such as red phosphorus, hydrated aluminum oxide, antimony trioxide, arsenic trioxide, ammonium polyphosphate and calcium sulfate or cyanuric acid derivatives such as melamine or mixtures of at least two flame retardants, for example ammonium polyphosphates and melamine and also, if desired, starch and/or expanded graphite, for making the PU elastomers produced according to the present invention flame resistant. In general, it has been found to be advantageous to use from 5 to 50 parts by weight, preferably from 5 to 25 parts by weight, of the specified flame retardants or mixtures per 100 parts by weight of the formative components (a) to (c).

Nucleating agents which can be used are, for example, talc, calcium fluoride, sodium phenylphosphinate, aluminum oxide and finely divided polytetrafluoroethylene in amounts of up to 5% by weight, based on the total weight of the formative components (a) to (c).

Suitable oxidation inhibitors and heat stabilizers which can be added to the PU elastomers of the present invention are, for example, halides of metals of group I of the Periodic Table, eg. sodium, potassium, lithium halides, if desired in combination with copper(I) halides, eg. chlorides, bromides or iodides, sterically hindered phenols, hydroquinones, and also substituted compounds of these groups and mixtures thereof, which are preferably used in a concentration of up to 1% by weight, based on the weight of the formative components (a) to (c).

Examples of UV stabilizers are various substituted resorcinols, salicylates, benzotriazoles and benzophenones and also sterically hindered amines, which are generally used in amounts of up to 2.0% by weight, based on the weight of the formative components (a) to (c).

Lubricants and mold release agents, which are generally likewise added in amounts of up to 1% by weight, based on the weight of the formative components (a) to (c), are stearic acid, stearyl alcohol, stearic esters and stearamides and also the fatty acid esters of pentaerythritol.

In addition, it is possible to add organic dyes such as nigrosine, pigments such as titanium dioxide, cadmium sulfide, cadmium sulfide selenide, phthalocyanines, ultramarine blue or carbon black.

Further details of the abovementioned other customary auxiliaries and additives may be found in the specialist literature, for example the monograph by J. H. Saunders and K. C. Frisch "High Polymers", volume XVI, Polyurethanes, parts 1 and 2, Interscience Publishers 1962 or 1964, or the Kunststoff-Handbuch, Polyurethane, volume VII, Carl-Hanser-Verlag, Munich, Vienna, 1st, 2nd and 3rd editions, 1966, 1983 and 1993.

To produce the compact or preferably cellular PU elastomers, the polyhydroxyl compounds (a), if desired extenders and/or crosslinkers (b) and, if desired, the chemically acting blowing agents, preferably water, and organic polyisocyanates (c) or preferably the prepolymers containing isocyanate groups and prepared from (a), (b) and (c) or preferably from (a) and (c), and chain extenders and/or crosslinkers (b), mixtures of partial amounts of (a) and (b), mixtures of partial amounts of (a), (b) and water or preferably mixtures of (b) and water or water can be reacted in the presence or absence of catalysts (d), physically acting blowing agents (e) and additives (f), in such amounts that the equivalence ratio of NCO groups of the polyisocyanates (c) or prepolymers containing isocyanate groups to the sum of the reactive hydrogens of the components (a) and, if used, (b) plus, if used, the chemically acting blowing agents is 0.8–1.2:1, preferably 0.95–1.15:1 and in particular 1.00–1.05:1.

The compact or preferably cellular PU elastomers can be produced by methods described in the literature, for example the one-shot or preferably prepolymer process, with the aid of known mixing equipment.

To produce the compact PU elastomers, the starting components can be homogeneously mixed in the absence of blowing agents (e), usually at from 80 to 160° C., preferably from 110 to 150° C., the reaction mixture can then be introduced into an open, heated or unheated mold and allowed to cure. To form cellular PU elastomers, the formative components can be mixed in a similar manner in the presence of blowing agent, preferably water, and introduced into the heated or unheated mold. After filling, the mold is closed and the reaction mixture is allowed to foam with compaction, eg. at a degree of compaction of from 1.1 to 8, preferably from 1.2 to 6 and in particular from 2 to 4, to form moldings. As soon as the moldings have sufficient strength they are removed from the mold. The demolding times are, inter alia, dependent on the mold temperature, mold geometry and the reactivity of the reaction mixture and are usually in a range from 10 to 60 minutes.

The compact PU elastomers produced by the process of the present invention have, without filler, a density of from 1.0 to 35 1.4 g/cm$^3$, preferably from 1.1 to 1.25 g/cm$^3$, with products containing fillers usually having a density greater than 1.2 g/cm$^3$. The cellular PU elastomers have densities of from 0.2 to 1.1 g/cm$^3$, preferably from 0.35 to 0.80 g/cm$^3$.

The PU elastomers produced by the process of the present invention are used for producing moldings, preferably for machine construction and the vehicle sector. The cellular PU elastomers are particularly suitable for producing damping and spring elements, eg. for vehicles, preferably motor vehicles, buffers and covering layers.

EXAMPLES

Comparative Example I a) Preparation of a prepolymer containing isocyanate groups and based on 1,5-NDI 1000 parts by weight (0.5 mol) of a poly(ethanediol(0.5 mol)-1,4-butanediol(0.5 mol) adipate(1 mol)) having an average molecular weight of 2000 (calculated from the experimentally determined hydroxyl number) were heated to 140° C. and at this temperature admixed and reacted with 240 parts by weight (1.14 mol) of solid 1,5-NDI with intensive stirring.

This gave a prepolymer having an NCO content of 4.32% by weight and a viscosity at 90° C. of 2800 mpa·s (measured using a rotation viscometer from Haake, by means of which the viscosities in the following Comparative Examples and Examples were also measured).

b) Production of cellular moldings

A crosslinker component comprising

| | |
|---|---|
| 20.7 | parts by weight of 2,2',6,6'-tetraisopropyldiphenylcarbodiimide, |
| 2.9 | parts by weight of a mixture of ethoxylated oleic and ricinoleic acid containing an average of 9 oxyethylene units, |
| 3.8 | parts by weight of the monoethanolamine salt of n-alkylbenzenesulfonic acid having $C_9$–$C_{15}$-alkyl radicals, |
| 36.3 | parts by weight of sodium salt of sulfated castor oil, |
| 36.3 | parts by weight of water and |
| 0.03 | part by weight of a mixture of 30% by weight of pentamethyldiethylenetriamine and 70% by weight of N-methyl-N'-(dimethylaminomethyl)piperazine | was prepared.

100 parts by weight of the isocyanate prepolymer prepared as described in Comparative Example Ia and heated to 90° C. were intensively stirred with 2.4 parts by weight of the crosslinker component for about 8 seconds. The reaction mixture was then introduced into a closable, metal mold heated to 80° C., the mold was closed and the reaction mixture was allowed to cure. After 25 minutes, the microcellular molding was removed from the mold and heated at 110° C. for 16 hours for further thermal curing.

Comparative Example II a) Preparation of a prepolymer containing isocyanate groups and based on 4,4'-MDI The procedure was as described in Comparative Example Ia, but the 1,5-NDI was replaced by 380 parts by weight (1.52 mol) of 4,4'-MDI heated to 50° C.

This gave a prepolymer having an NCO content of 6.19% by weight and a viscosity at 90° C. of 1600 mpa·s (measured using a rotation viscometer).

b) Production of a cellular test plate 100 parts by weight of the prepolymer described in Comparative Example IIa and 3.42 parts by weight of the crosslinker component described in Comparative Example Ib were reacted by a method similar to Comparative Example I and the reaction mixture was molded to form test plates. The reaction mixture was not able to be processed into test springs for the dynamic test.

Comparative Example III a) Preparation of a prepolymer containing isocyanate groups and based on 4,4'-MDI A mixture of 1000 parts by weight of the poly (ethanediol-1,4-butanediol adipate) described in Comparative Example I and 3 parts by weight of trimethylolpropane was reacted with 380 parts by weight (1.52 mol) of 4,4'-MDI heated to 50° C. using a method similar to Comparative Example II.

This gave a prepolymer having an NCO content of 5.80% by weight and a viscosity at 90° C. of 1750 mpa·s (measured using a rotation viscometer).

b) Production of cellular moldings

Moldings were produced from 100 parts by weight of the prepolymer described in Comparative Example IIIa and 3.1 parts by weight of the crosslinker component described in Comparative Example Ib using a method similar to Comparative Example I.

Comparative Example IV a) Preparation of a prepolymer containing isocyanate groups and based on TODI The procedure was as described in Comparative Example Ia, but the 1,5-NDI was replaced by 290 parts by weight (1.097 mol) of 3,3'-dimethylbiphenyl 4,4'-diisocyanate (tolidine diisocyanate (TODI)).

This gave a prepolymer having an NCO content of 3.76% by weight and a viscosity at 90° C. of 5100 mpa·s (measured using a rotation viscometer).

b) Production of cellular moldings

Moldings were produced from 100 parts by weight of the prepolymer described in Comparative Example IVa and 2.07 parts by weight of the crosslinker component described in Comparative Example Ib using a method similar to Comparative Example I. The moldings were removed from the mold only after a mold residence time of 40 minutes and were heated at 110° C. for 16 hours for further thermal curing.

Example 1 a) Preparation of a prepolymer containing isocyanate groups and based on 4,4'-MDI/1,5-NDI 1000 parts by weight (0.5 mol) of a poly(ethanediol(0.5 mol)-,1,4-butanediol(0.5 mol) adipate(1 mol)) having an average molecular weight of 2000 (calculated from the experimentally determined hydroxyl number) were heated to 140° C., while stirring vigorously 190 parts by weight (0.76 mol) of 4,4'-MDI heated to 50° C. and directly thereafter 80 parts by weight (0.38 mol) of solid 1,5-NDI were added and reacted. After a reaction time of about 30 minutes, this gave a polyaddition product containing urethane and isocyanate groups and having an NCO content of 4.1% by weight. This reaction product was reacted at 120° C. with an additional 80 parts by weight (0.38 mol) of solid 1,5-NDI and cooled while stirring to 90° C. over a period of about 40 minutes.

This gave a prepolymer having an NCO content of 6.27% by weight and a viscosity at 90° C. of 3200 mpa·s (measured using a rotation viscometer).

b) Production of cellular moldings 100 parts by weight of the isocyanate prepolymer based on 4,4'-MDI/1,5-NDI prepared as described in Example 1a and heated to 90° C. were mixed while stirring vigorously with 3.48 parts by weight of the crosslinker component prepared as described in Comparative Example Ib.

After stirring for about 8 seconds, the reaction mixture was introduced into a closable, metal mold heated to 80° C., the mold was closed and the reaction mixture was allowed to cure. After a mold residence time of 25 minutes, the microcellular molding was removed from the mold and heated at 110° C. for 16 hours for further thermal curing.

Example 2 a) Preparation of a prepolymer containing isocyanate groups and based on 4,4'-MDI/1,5-NDI The procedure was as described in Example 1, but the 1000 parts by weight (0.5 mol) of the poly(ethanediol-1,4-butanediol adipate) were first mixed with 285 parts by weight (1.14 mol) of 4,4'-MDI and directly thereafter with 40 parts by weight (0.19 mol) of 1,5-NDI.

After a reaction time of about 30 minutes, the resulting polyaddition product containing urethane and isocyanate groups, which had an NCO content of 5.2% by weight, was admixed with a further 40 parts by weight (0.19 mol) of 1,5-NDI.

This gave a prepolymer having an NCO content of 6.24% by weight and a viscosity at 90° C. of 1800 mpa·s (measured using a rotation viscometer).

b) Production of cellular moldings

The cellular moldings were produced using the prepolymer described in Example 2a and a method similar to Example 1b.

Example 3 a) Preparation of a prepolymer containing isocyanate groups and based on 4,4'-MDI/1,5-NDI The procedure was as described in Example 1, but the 1000 parts by weight (0.5 mol) of the poly(ethanediol-1,4-butanediol adipate) were admixed first with 285 parts by weight (1.14 mol) of 4,4'-MDI and immediately thereafter with 80 parts by weight (0.381 mol) of 1,5-NDI.

After a reaction time of about 60 minutes in a temperature range from 160 to 90° C., this gave a prepolymer having an NCO content of 6.17% by weight and a viscosity at 90° C. of 1800 mpa·s (measured using a rotation viscometer).

b) Production of cellular moldings

The cellular moldings were produced using the prepolymer described in Example 2a and a method similar to Example 1b.

Example 4 a) Preparation of a prepolymer containing isocyanate groups and based on 4,4'-MDI/1,5-NDI 40 parts by weight (0.19 mol) of solid 1,5-NDI were dissolved in 285 parts by weight (1.14 mol) of 4,4'-MDI heated to 110° C. This solution was admixed while stirring vigorously with 1000 parts by weight (0.5 mol) of the poly(ethanediol-1,4-butanediol adipate) specified in Example 1a, heated to 125° C., added in portions over a period of 7 minutes.

After a reaction time of about 35 minutes at from 110 to 120° C., this gave a polyaddition product containing urethane and isocyanate groups and having an NCO content of 5.2% by weight, and this polyaddition product was reacted with a further 40 parts by weight (0.19 mol) of solid 1,5-NDI. After a reaction time of about 70 minutes at from 100 to 120° C., the reaction mixture was allowed to cool to 90° C.

This gave a prepolymer having an NCO content of 6.17% by weight and a viscosity at 90° C. of 2100 mPa·s (measured using a rotation viscometer).

b) Production of cellular moldings

The cellular moldings were produced using the prepolymer described in Example 4a and a method similar to Example 1b.

Example 5 a) Preparation of a prepolymer containing isocyanate groups and based on 4,4'-MDI/1,5-NDI The procedure was as described in Example 1, but the 1000 parts by weight (0.5 mol) of the poly(ethanediol-1,4-butanediol adipate) were admixed first with 304 parts by weight (1.22 mol) of 4,4'-MDI and immediately thereafter with 32 parts by weight (0.152 mol) of 1,5-NDI.

The resulting polyaddition product containing urethane and isocyanate groups, which had an NCO content of 5.4% by weight, was admixed with a further 32 parts by weight (0.152 mol) of 1,5-NDI.

This gave a prepolymer having an NCO content of 6.20% by weight and a viscosity at 90° C. of 1900 mpa·s (measured using a rotation viscometer).

b) Production of cellular moldings

The cellular moldings were produced using the prepolymer as described in Example 5a and a method similar to Example 1b.

Example 6 a) Preparation of a prepolymer containing isocyanate groups and based on 4,4'-MDI/1,5-NDI The procedure was as described in Example 1, but the 1000parts by weight (0.5 mol) of the poly(ethanediol-1,4-butanediol adipate) were admixed first with 342 parts by weight (1.37 mol) of 4,4'-MDI and immediately thereafter with 16 parts by weight (0.076 mol) of 1,5-NDI.

The resulting polyaddition product containing urethane and isocyanate groups, which had an NCO content of 5.8% by weight, was admixed with 16 parts by weight (0.076 mol) of 1,5-NDI.

This gave a prepolymer having an NCO content of 6.14% by weight and a viscosity at 90° C. of 1700 mpa·s (measured using a rotation viscometer).

b) Production of cellular moldings

The cellular moldings were produced using the prepolymer as described in Example 6a and a method similar to Example 1b.

Example 7 a) Preparation of a prepolymer containing isocyanate groups and based on 4,4'-MDI/1,5-NDI The procedure was as described in Example 1, but the 1000 parts by weight (0.5 mol) of the poly(ethanediol-1,4-butanediol adipate) were admixed first with 265 parts by weight (1.06 mol) of 4,4'-MDI and then with 37 parts by weight (0.176 mol) of 1,5-NDI.

The resulting polyaddition product containing urethane and isocyanate groups, which had an NCO content of 4.7% by weight, was admixed with a further 37 parts by weight (0.176 mol) of 1,5-NDI.

This gave a prepolymer having an NCO content of 5.58% by weight and a viscosity at 90° C. of 2500 mpa·s (measured using a rotation viscometer).

b) Production of cellular moldings

Moldings were produced from 100 parts by weight of the prepolymer as described in Example 7a and 3.08 parts by weight of the crosslinker component as described in Comparative Example Ib using a method similar to Example 1b.

Example 8 a) Preparation of a prepolymer containing isocyanate groups and based on 4,4'-MDI/1,5-NDI The procedure was as described in Example 7, but the poly(ethanediol-1,4-butanediol adipate) was replaced by 1000 parts by weight (0.5 mol) of a poly(1,4-butanediol(1 mol)-1,6-hexanediol(1 mol) adipate(2 mol)) having an average molecular weight of 2000 (calculated from the experimentally determined hydroxyl number).

This gave a prepolymer having an NCO content of 5.48% by 1s weight and a viscosity at 90° C. of 3200 mpa·s (measured using a rotation viscometer).

b) Production of cellular moldings

Moldings were produced from 100 parts by weight of the prepolymer as described in Example 8a and 3.02 parts by weight of the crosslinker component as described in Comparative Example Ib using a method similar to Example 1b.

The cellular moldings produced as described in Comparative Examples Ib to IVb and Examples 1b to 8b were used to measure the static and dynamic mechanical properties of the microcellular PU elastomers.

The static mechanical properties measured were the tensile strength in accordance with DIN 53 571, the elongation at break in accordance with DIN 53 571, the tear propagation resistance in accordance with DIN 53 515 and the compressive set at 80° C. by a method adapted from DIN 53 572 using spacers having a height of 18 mm and test specimens having a base area of 40×40 mm and a height of 30±1 mm. The compressive set (CS) was calculated in accordance with the equation $$CS = \frac{H_0 - H_2}{H_0 - H_1} \cdot 100 \ [\%]$$

where $H_0$ is the original height of the test specimen in mm, $H_1$ is the height of the test specimen in the deformed state in mm and $H_2$ is the height of the test specimen after decompression in mm.

The dynamic mechanical properties determined were the displacement increase (DI) at maximum force and the consolidation (CN) (Figure). The molding for measuring the consolidation was a cylindrical test spring having 3 segment constrictions and a height of 100 mm, an external diameter of 50 mm and an internal diameter of 10 mm. After loading the spring over 100,000 load cycles at a force of 6 kN and a frequency of 1.2 Hz, the CN is measured as the difference between the initial and final heights of the spring and is reported in percent. The consolidation is a measure of the permanent deformation of the cellular PU elastomer during the cyclic fatigue test. The lower this consolidation, the better the dynamic performance of the material.

The height $H_R$ for determining the consolidation after the dynamic test is determined after recording the characteristic line of the spring: $H_0$ is the initial height; the molding is precompressed 3× using the maximum force (maximum force for the characteristic lines) and the characteristic line is then recorded in a 4th cycle at a comperssion rate of 50 mm/min. After 10 minutes, $H_1$ is determined; this is the height of the component after recording the characteristic line. Only then is the dynamic test commenced.

$H_R$=residual height after the dynamic test measured after storage for 24 hours at 23° C./50% relative atmospheric humidity after the end of the dynamic test. The reference point (=initial height) used for determining the permanent consolidation after the dynamic test is $H_0$, the height of the spring in a completely "as new" condition, without any compression:

$$CN = \frac{H_0 - H_R}{H_0} \times 100 \; [\%]$$

The dynamic test is carried out without additional cooling in an air conditioned room at 23° C. and 50% relative atmospheric humidity. The mechanical properties measured on the test specimens are summarized in the following Table.

We claim:
1. A process for the formation of non-thermoplastic polyurethane elastomers comprising the steps of:
   a) forming an isocyanate-terminated prepolymer having from 3.3 to 10% free NCO by reacting a polyhydroxyl compound having a molecular weight of from 800 to 6000 with naphthylene 1,5-diisocyanate (1,5 NDI) and at least one other aromatic diisocyanate selected from the group consisting of: tolylene diisocyanate; diphenylmethane diisocyanate; 3,3'-dimethylbiphenyl diisocyanate; 1,2-diphenylethane diisocyanate; phenylene diisocyanate; hexamethylene 1,6-diisocyanate; and 1-isocyanato-3,3,5-trimethyl-5-isocyanatomethylcyclohexane; wherein the equivalence ratios of OH:NCO of the other aromatic diisocyanate:NCO of 1,5 NDI is from 1:(>1 to 6):0.02 to 6;
   b) reacting the isocyanate-terminated prepolymer formed in step a) with a polyhydroxyl compound having a molecular weight of from 800 to 6000; and, optionally, with
   c) a chain extender and/or a crosslinker having a molecular weight of up to 800, and, optionally, with;
   d) a catalyst, and, optionally, with;
   e) a water-containing blowing agent, and, optionally, with;
   f) additives; and
   thereby forming a non-thermoplastic polyurethane elastomer.
2. A process as claimed in claim 1 wherein the polyhydroxyl compound has a functionality of from 2 to 3.

TABLE

Static and dynamic mechanical properties of the cellular PU elastomers as described in Comparative Examples I to IV and Examples 1 to 8

| Example Comparative Example | I | IX | III | IV | 1 | 2 | 3 | 4 | 5 | 6 | 7 | 8 |
| --- | --- | --- | --- | --- | --- | --- | --- | --- | --- | --- | --- | --- |
| Diisocyanate basis of isocyanate prepolymer | NDI | MDI | MDI | TODI | 1 MDI/ 1 NDI | 3 MDI/ 1 NDI | 3 MDI/ 1 NDI | 3 MDI/ 1 NDI | 4 MDI/ 1 NDI | 9 MDI/ 1 NDI | 3 MDI/ 1 NDI | 3 MDI/ 1 NDI |
| NCO content [%] | 4.32 | 6.19 | 5.8 | 3.76 | 6.27 | 6.24 | 6.17 | 6.17 | 6.20 | 6.14 | 5.58 | 5.48 |
| Viscosity at 90° C. [mPa·s] | 2800 | 1600 | 1750 | 5100 | 3200 | 1800 | 1800 | 2100 | 1900 | 1700 | 2500 | 3200 |
| Static mechanical properties | | | | | | | | | | | | |
| Compressive set [80° C., %] | 20 | 43 | 20 | 18 | 15 | 15 | 12 | 14 | 14 | 20 | 21 | 15 |
| Tensile strength [N/mm$^2$] | 3.6 | 4.5 | 4.3 | 3.5 | 4.7 | 5.2 | 4.5 | 4.3 | 4.6 | 4.9 | 4.0 | 4.0 |
| Elongation [%] | 350 | 510 | 460 | 430 | 460 | 490 | 470 | 460 | 490 | 530 | 550 | 470 |
| Tear propagation resistance [N/mm] | 16.2 | 19.9 | 17.3 | 17.1 | 16.1 | 17.4 | 16.5 | 16.0 | 18.3 | 19.4 | 16.6 | 13.6 |
| Dynamic mechanical properties | | | | | | | | | | | | |
| Consolidation [%] | 8 | — | 16–18 | 10–12 | 6–7 | 7–8 | 7–8 | 7–8 | 6–9 | 9–10 | 8–10 | 9–10 |
| Displacement increase [mm] | 1.4–2.1 | — | 5.0–5.7 | 2.4–2.6 | 1.6–1.9 | 2.2–2.5 | 2.4–2.6 | 2.2–2.4 | 2.4–2.6 | 2.5–2.7 | 2.8–3.0 | 2.3–2.5 |

3. A process as claimed in claim 1, wherein the polyhydroxyl compound is difunctional, has a molecular weight of from 800 to 3500 and is selected from the group consisting of polyester polyols, hydroxyl-containing polycarbonates and polyoxybutylene glycols.

4. A process as claimed in claim 1, wherein the chain extender is selected from the group consisting of alkanediols, dialkylene glycols and polyoxyalkylene glycols and the crosslinker is selected from the group consisting of trihydric or tetrahydric alcohols and oligomeric polyoxyalkylene polyols having a functionality of from 3 to 4.

5. A process as claimed in claim 1, wherein step a) further comprises reacting the polyhydroxyl compound with a flowable mixture of naphthylene 1,5-diisocyanate and the at least one other aromatic diisocyanate.

6. A process as claimed in claim 1, wherein step a) further comprises reacting the polyhydroxyl compound with a melt of naphthylene 1,5-diisocyanate and diphenylmethane 4,4'-diisocyanate.

7. A process as claimed in claim 1, wherein step a) further comprises reacting the polyhydroxyl compound or a mixture of the polyhydroxyl compound and a chain extender and/or crosslinker with the at least one other aromatic diisocyanate to give a polyaddition product containing urethane groups and reacting this polyaddition product with naphthylene 1,5-diisocyanate to give the prepolymer.

8. A process as claimed in claim 1, wherein step a) further comprises reacting the polyhydroxyl compound or a mixture of the polyhydroxyl compound and a chain extender and/or crosslinker with diphenylmethane 4,4'-diisocyanate to give a polyaddition product containing urethane groups and reacting this polyaddition product with naphthylene 1,5-diisocyanate to give the prepolymer.

9. A process as claimed in any of claims 2–8 and 1, wherein the blowing agent e) is water and, optionally, at least one co-blowing agent which is selected from the group consisting of alkanes having from 4 to 8 carbon atoms and cycloalkanes having from 4 to 6 carbon atoms.

10. A process as claimed in claim 1, wherein the elastomer has a density of from 0.2 to 1.1 g/l.

11. A process for forming an isocyanate-terminated prepolymer containing isocyanate groups, having an NCO content of from 3.3 to 10% by weight comprising first reacting at least one polyhydroxyl compound a) or a mixture of a) and a chain extender and/or crosslinker b) with at least one aromatic diisocyanate selected from the group consisting of tolylene diisocyanate, diphenylmethane diisocyanate, 3,3'-dimethylbiphenyl diisocyanate, 1,2-diphenylethane diisocyanate, phenylene diisocyanate, hexamethylene 1,6-diisocyanate, and 1-isocyanto-3,3,5-trimethyl-5-isocyanatomethylcyclohexane to give a polyaddition product containing urethane and isocyanate groups and having an NCO content of from 0.05 to 8% by weight, and subsequently reacting the reaction product with naphthylene 1,5-diisocyanate to give the prepolymer.

12. A prepolymer as claimed in claim 11, comprising the further step of setting the equivalence ratio of the hydroxyl groups of a) or a) and b) to NCO groups of the aromatic diisocyanate to NCO groups of naphthylene 1,5-diisocyanate to 1:(>1 to 6):0.02–6.

13. A process as claimed in claim 11 comprising selecting diphenylmethane 4,4'-diisocyanate as the at least one aromatic diisocyanate.

14. A process for forming an isocyanate-terminated prepolymer containing isocyanate groups, having an NCO content of from 3.3 to 10% by weight comprising first reacting a difunctional polyhydroxyl compound having a molecular weight of greater than 800 to 3500 and selected from the group consisting of polyester polyols, hydroxyl-containing polycarbonates and polyoxytetramethylene glycols with diphenylmethane 4,4'-diisocyanate to give a polyaddition product containing urethane and isocyanate groups, then subsequently reacting the product with naphthylene 1,5-diisocyanate to give the prepolymer containing isocyanate groups.

15. A process as claimed in claim 13, further comprising setting the equivalence ratios of the hydroxyl groups of a) or a) and b) to NCO groups of the diphenylmethane 4,4'-diisocyanate to NCO groups of the naphthylene 1,5-diisocyanate to 1:(>1 to 6):0.02–6.

16. A process as claimed in claim 14, further comprising setting the equivalence ratios of the hydroxyl groups of a) or a) and b) to NCO groups of the diphenylmethane 4,4'-diisocyanate to NCO groups of the naphthylene 1,5-diisocyanate to 1:(>1 to 6):0.02–6.

* * * * *